(12) United States Patent
Shimizu et al.

(10) Patent No.: US 8,747,276 B2
(45) Date of Patent: Jun. 10, 2014

(54) DRIVE DEVICE AND IMAGE FORMING APPARATUS INCLUDING SAME

(75) Inventors: Keisuke Shimizu, Tokyo (JP); Yasuhiro Maehata, Tokyo (JP); Katsuaki Miyawaki, Kanagawa (JP); Tetsuo Watanabe, Kanagawa (JP); Hiromichi Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 13/531,704

(22) Filed: Jun. 25, 2012

(65) Prior Publication Data
US 2013/0017924 A1 Jan. 17, 2013

(30) Foreign Application Priority Data

Jul. 12, 2011 (JP) .................................. 2011-153864

(51) Int. Cl.
*F16H 57/08* (2006.01)
(52) U.S. Cl.
USPC ............................. 475/339; 475/331; 475/345
(58) Field of Classification Search
USPC .................. 475/330, 331, 337, 339, 345, 346
See application file for complete search history.

(56) References Cited

U.S. PATENT DOCUMENTS

| | | | | |
|---|---|---|---|---|
| 5,679,089 A | * | 10/1997 | Levedahl | 475/332 |
| 7,121,205 B2 | * | 10/2006 | Ono et al. | 101/480 |
| 7,223,197 B2 | * | 5/2007 | Poulin et al. | 475/331 |
| 2004/0023750 A1 | * | 2/2004 | Schulz et al. | 475/331 |
| 2004/0151518 A1 | * | 8/2004 | Mizoguchi | 399/167 |
| 2006/0252596 A1 | * | 11/2006 | Abarquez et al. | 475/331 |
| 2009/0017953 A1 | * | 1/2009 | Uehara et al. | 475/149 |
| 2010/0304918 A1 | * | 12/2010 | Burgman et al. | 475/331 |
| 2010/0323836 A1 | * | 12/2010 | Wang et al. | 475/1 |

FOREIGN PATENT DOCUMENTS

| | | |
|---|---|---|
| JP | 6-73504 U | 10/1994 |
| JP | 10-240069 A | 9/1998 |
| JP | 2001-330087 A | 11/2001 |
| JP | 2004-219836 A | 8/2004 |
| JP | 2005-076777 A | 3/2005 |
| JP | 2008-151868 A | 7/2008 |
| JP | 2009-037198 A | 2/2009 |

* cited by examiner

*Primary Examiner* — Justin Holmes
(74) *Attorney, Agent, or Firm* — Harness, Dickey & Pierce, P.L.C.

(57) ABSTRACT

A drive device including a planetary gear reduction device having at least two stages and an output shaft, and a driven shaft to support a driven member rotatively driven by torque reduced by the planetary gear reduction device and transmit the torque from the output shaft to the driven member. Each stage of the planetary gear reduction device includes a sun gear, an outer gear, multiple planetary gears, a carrier, and a support shaft. The output shaft is provided to the carrier of the last stage. Central axes of the sun gear, the outer gear, the carrier, the output shaft, the driven shaft, and the driven member are all arranged coaxially with one another and at least one carrier is floatingly supported relative to the outer gear. The carrier is formed as a single integrated unit having holes into which both ends of the support shaft are fitted.

16 Claims, 11 Drawing Sheets

FIG. 8A
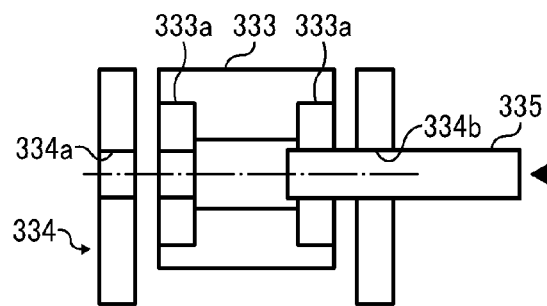
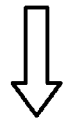
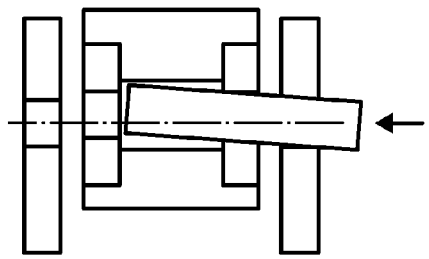
FIG. 8B
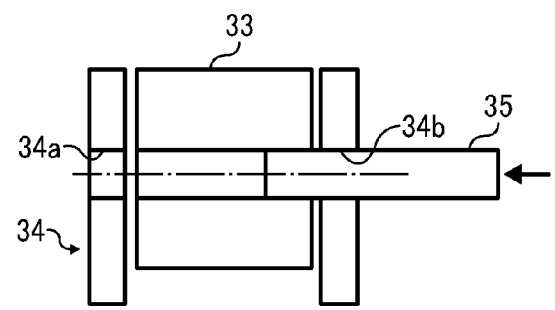
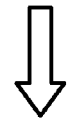
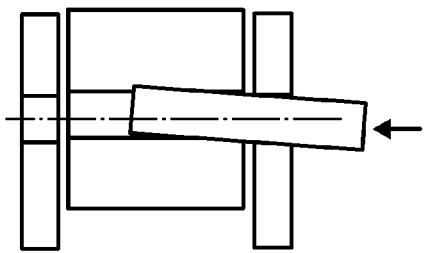

DRIVE DEVICE AND IMAGE FORMING APPARATUS INCLUDING SAME

CROSS-REFERENCE TO RELATED APPLICATION

The present patent application is based on and claims priority pursuant to 35 U.S.C. §119 from Japanese Patent Application No. 2011-153864, filed on Jul. 12, 2011 in the Japan Patent Office, which is incorporated by reference herein in its entirety.

BACKGROUND OF THE INVENTION

1. Field of the Invention

Exemplary aspects of the present invention generally relate to a drive device that rotatively drives a driven member via a planetary gear reduction device, and an image forming apparatus including the drive device.

2. Description of the Related Art

Related-art image forming apparatuses, such as copiers, printers, facsimile machines, and multifunction devices having two or more of copying, printing, and facsimile functions, typically form a toner image on a recording medium (e.g., a sheet of paper, etc.) according to image data using an electrophotographic method. In such a method, for example, a charger charges a surface of a rotatable cylindrical image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor directly onto a sheet or primarily transfers the toner image from the photoconductor onto a rotatable seamless belt (e.g., an intermediate transfer belt) and then secondarily transfers the toner image from the belt onto a sheet; and a fixing device applies heat and pressure to the sheet bearing the toner image to fix the toner image onto the sheet. The sheet bearing the fixed toner image is then discharged from the image forming apparatus.

The image forming apparatuses often include a drive device that transmits torque from a drive source to the photoconductor or the intermediate transfer belt via a planetary gear reduction device to rotatively drive the photoconductor or the intermediate transfer belt. The planetary gear reduction device has good durability and provides a higher reduction rate with reduced installation space compared to large-sized resin gears and so forth.

Various types of drive devices using the planetary gear reduction device have been proposed. For example, JP-2008-151868-A discloses a drive device 800 that rotatively drives a driven member such as a drive roller 80 for the photoconductor or the intermediate transfer belt as illustrated in FIG. 1. Front and rear portions of the drive roller 80 are held by front and rear holders 81 and 82 via bearings, respectively, and the front and rear holders 81 and 82 are positioned by front and rear lateral plates 83 and 84, respectively. A planetary gear reduction device 85 and a motor 86, which is a drive source for the planetary gear reduction device 85, are disposed within the drive roller 80 and are held by the rear holder 82. An end of the motor 86 opposite an output end thereof is supported by the rear lateral plate 84 via a bearing. Such a configuration allows installation of the drive system within the drive roller 80, thereby reducing installation space of the drive device 800 as a whole and thus providing a more compact image forming apparatus.

In another approach, JP-H10-240069-A discloses a drive device in which a planetary roller reduction mechanism and a motor are provided outside a photoconductor so that output shafts of each of the motor, the photoconductor, and the planetary roller reduction mechanism are arranged coaxially with the other. Accordingly, installation space of the drive device in a direction of diameter of the photoconductor can be reduced, thereby making the image forming apparatus more compact. In addition, in the planetary roller reduction mechanism used for the above-described drive device, only a single side of a support shaft of a planetary roller is supported by a roller support member, thereby reducing installation space of the planetary roller reduction mechanism in an axial direction of the mechanism.

In yet another approach, JP-2001-330087-A discloses a drive device (an actuator) including a planetary gear reduction device. A first sun gear in the first stage of the planetary gear reduction device is extended to an opening formed in an output shaft-side of a housing that holds an outer gear, and sun gears in the second stage and so on are rotatably mounted to the first sun gear. Planetary gears, support shafts of each of the planetary gears, and carriers are assembled in advance as a carrier assembly and then installed in the housing. Each of the support shafts is inserted into needle bearings provided to each of the planetary gears, and both ends of the support shaft, each having a reduced diameter, are sandwiched by first and second lateral plates of the carrier, respectively. The first lateral plate has multiple legs formed together with the first lateral plate as a single integrated component, and the first and second lateral plates are coupled to each other by the legs and the support shafts sandwiched by the first and second lateral plates. Such a configuration allows easy assembly of the planetary gear reduction device and prevents deformation of the carrier assembly, thereby improving durability of each gear.

However, in the drive device 800 disclosed in JP-2008-151868-A, both the motor 86 and the rear holder 82 are positioned by the rear lateral plate 84. The motor 86 is also held by the rear holder 82. In other words, the motor 86 is positioned by the two members, that is, the rear lateral plate 84 and the rear holder 82. Consequently, a variation in the size of each component may cause irregular assembly at a portion where the motor 86 is positioned by the rear lateral plate 84 or deformation of the motor 86 or the rear holder 82. As a result, the planetary gear reduction device 85 and the motor 86 cannot be accurately positioned relative to the driven member such as the photoconductor and the intermediate transfer belt, and the driven member cannot be accurately positioned relative to the rear lateral plate 84, thereby preventing accurate rotation of the driven member.

In the drive device disclosed in JP-H10-240069-A, because only the single side of the support shaft of the planetary roller is supported by the roller support member as described previously, the support shaft of the planetary roller may be tilted. Consequently, the planetary roller may partially contact a sun roller or a stationary roller, thereby degrading durability of the planetary roller and causing rotational fluctuation of the planetary roller. As a result, the drive device cannot accurately drive the driven member such as the photoconductor.

With regard to the drive device disclosed in JP-2001-330087-A, a variation in the size of each component and assembly tolerance may displace a first hole formed in the first lateral plate to hold one end of the support shaft of each of the planetary gears and a second hole formed in the second lateral plate to hold the other end of the support shaft from each other, thereby possibly tilting the planetary gears. The tilt of the planetary gears degrades durability of the planetary gears and causes rotational fluctuation of the planetary gears. As a result, the drive device cannot accurately drive the driven member. In addition, alignment clearance is not provided between each of the carriers and each of the sun gears respectively fitted into input shafts. Consequently, rotational fluctuation caused by tolerances of each of the planetary gears, the sun gears, and the stationary gear is transmitted to the output shaft, thereby preventing accurate driving of the driven member.

Inaccurate driving of the driven member causes speed fluctuation of the driven member such as the photoconductor and the intermediate transfer belt, resulting in jitter or uneven image density in an output image. Continuous speed fluctuation of the photoconductor or the intermediate transfer belt at a certain frequency periodically causes uneven image density throughout the output image, resulting in stripes, or banding. In addition, speed fluctuation of the photoconductor shifts a sub-scanning position of an exposure line and a sub-scanning position upon primary transfer of the toner image from the photoconductor onto the intermediate transfer belt. Further, speed fluctuation of the intermediate transfer belt shifts a sub-scanning position upon secondary transfer of the toner image from the intermediate transfer belt onto the sheet as well as upon primary transfer of the toner image. Thus, banding caused by speed fluctuation of the photoconductor and the intermediate transfer belt considerably degrades image quality.

BRIEF SUMMARY OF THE INVENTION

In view of the foregoing, illustrative embodiments of the present invention provide a novel drive device that transmits torque from a drive source to a driven member via a planetary gear reduction device to accurately drive the driven member, and an image forming apparatus including the drive device.

In one illustrative embodiment, a drive device includes a planetary gear reduction device having at least two stages and an output shaft, and a driven shaft to support a driven member rotatively driven by torque reduced by the planetary gear reduction device and transmit the torque from the output shaft of the planetary gear reduction device to the driven member. Each stage of the planetary gear reduction device includes a sun gear rotatable by torque from a drive source, an outer gear disposed coaxially with the sun gear, multiple planetary gears disposed within the outer gear at equal intervals along an inner circumference of the outer gear to engage both the sun gear and the outer gear, respectively, a carrier rotatable coaxially with both the sun gear and the outer gear to rotatably support the multiple planetary gears, and a support shaft held by the carrier to rotatably support each of the multiple planetary gears. The output shaft is provided to the carrier of the last stage. Central axes of the sun gear, the outer gear, the carrier, the output shaft, the driven shaft, and the driven member are all arranged coaxially with one another and at least one carrier is floatingly supported relative to the outer gear. The carrier is formed as a single integrated unit having holes into which both ends of the support shaft are fitted.

In another illustrative embodiment, an image forming apparatus includes a driven member and the drive device described above.

Additional features and advantages of the present disclosure will become more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 8A is a schematic view illustrating insertion of a carrier pin into a planetary gear according to a comparative example;

FIG. 8B is a schematic view illustrating insertion of a carrier pin into the planetary gear according to the first illustrative embodiment;

DETAILED DESCRIPTION OF ILLUSTRATIVE EMBODIMENTS

Figure 1:
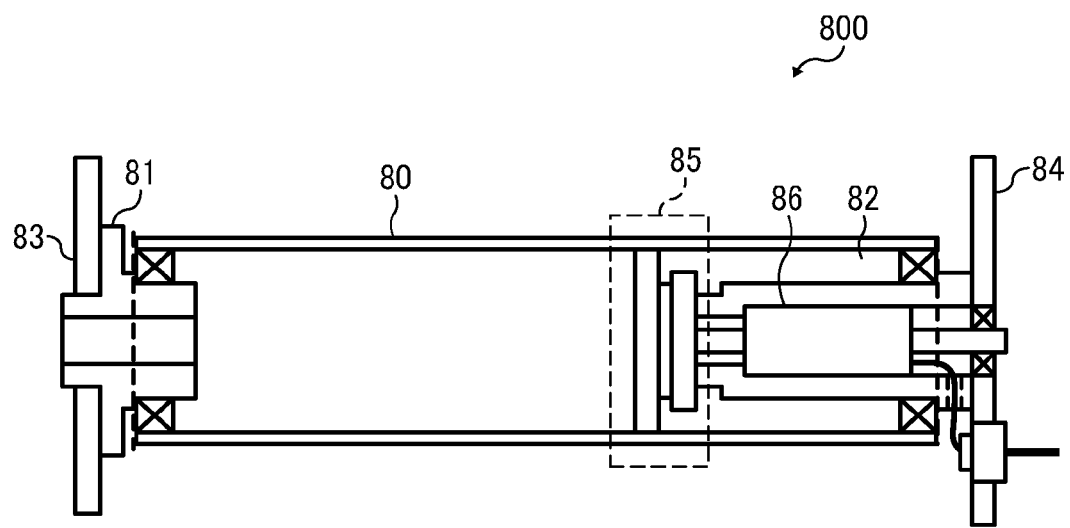
FIG. 1 is a schematic view illustrating an example of a configuration of a related-art drive device.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

Figure 2:
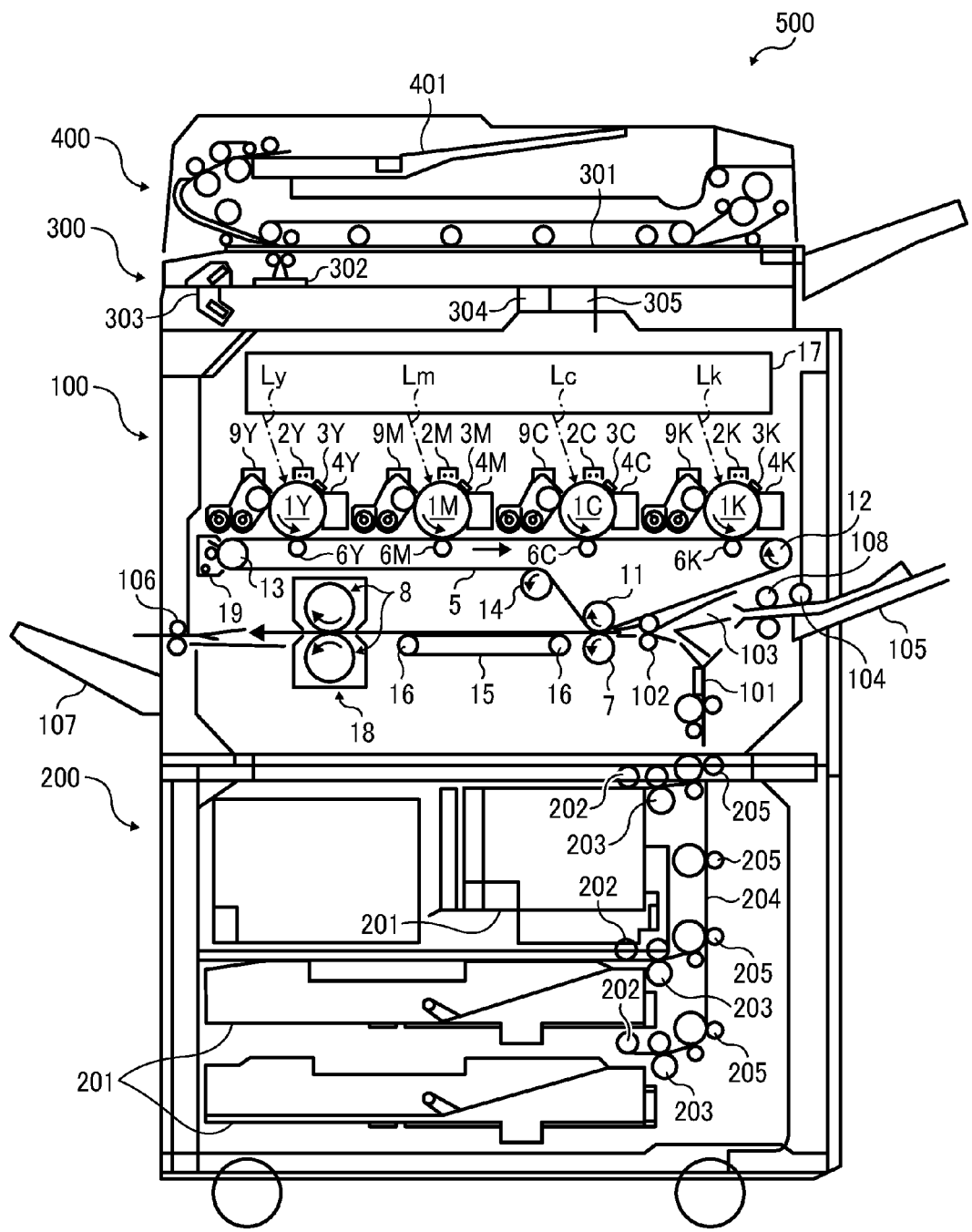
FIG. 2 is a vertical cross-sectional view illustrating an example of a configuration of an image forming apparatus according to illustrative embodiments.

A description is now given of a configuration of a tandem-type image forming apparatus 500 according to illustrative embodiments. The image forming apparatus 500 is a full-color copier employing an electrophotographic system. FIG. 2 is a vertical cross-sectional view illustrating an example of a configuration of the image forming apparatus 500 according to illustrative embodiments.

The image forming apparatus 500 employs a dry-type two-component developing method using dry-type two-component developer and includes a body 100, a sheet feeder 200 provided below the body 100, a scanner 300 provided on the body 100, and an automatic document feeder (ADF) 400 provided above the scanner 300. In the image forming apparatus 500, an image is formed based on image data read by the scanner 300. Four image carriers to be driven, that is, photoconductors 1Y, 1M, 1C, and 1K (hereinafter collectively referred to as photoconductors 1), on each of which an image of a specific color, that is, yellow (Y), magenta (M), cyan (C), or black (K), is formed, are provided in the body 100. The photoconductors 1 are arranged side by side to contact a seamless intermediate transfer belt 5 in a direction of movement of the intermediate transfer belt 5. The intermediate transfer belt 5 is wound around multiple rollers including a drive roller 12 described in detail later.

Electrophotographic processing members such as chargers 2Y, 2M, 2C, and 2K (hereinafter collectively referred to as chargers 2), developing devices 9Y, 9M, 9C, and 9K (hereinafter collectively referred to as developing devices 9), cleaning devices 4Y, 4M, 4C, and 4K (hereinafter collectively referred to as cleaning devices 4), and neutralizing lamps 3Y, 3M, 3C, and 3K (hereinafter collectively referred to as neutralizing lamps 3) are provided around the photoconductors 1, respectively, in that order in which they come into play as processing proceeds. An optical writing device 17 is provided above the photoconductors 1. The image forming apparatus 500 further includes primary transfer rollers 6Y, 6M, 6C, and 6K (hereinafter collectively referred to as primary transfer rollers 6) disposed opposite the photoconductors 1, respectively, with the intermediate transfer belt 5 interposed therebetween.

The intermediate transfer belt 5 is wound around an extension roller 11, the drive roller 12, an extension roller 13, and a tension roller 14, and is rotated by rotation of the drive roller 12 rotatively driven by a drive source, not shown. A belt cleaning device 19 that removes residual toner from the intermediate transfer belt 5 after secondary transfer of a toner image formed on the intermediate transfer belt 5 onto a recording medium such as a sheet of paper is provided opposite the extension roller 13 with the intermediate transfer belt 5 interposed therebetween. The extension roller 11 is disposed opposite a secondary transfer roller 7 and a secondary transfer nip is formed therebetween with the intermediate transfer belt 5 interposed therebetween.

A conveyance belt 15 wound around a pair of extension rollers 16 is provided downstream from the secondary transfer nip in a direction of conveyance of the sheet. The conveyance belt 15 conveys the sheet onto which the toner image is secondarily transferred to a fixing device 18. The fixing device 18 includes a pair of fixing rollers 8. Heat and pressure are supplied to the sheet at a fixing nip formed between the pair of fixing rollers 8 so that the toner image is fixed to the sheet.

A description is now given of image formation performed by the image forming apparatus 500. To form a full-color image using the image forming apparatus 500, first, a document is placed on a document stand 401 provided to the ADF 400. Alternatively, the ADF 400 may be opened to set the document on a contact glass 301 of the scanner 300. Then, the ADF 400 may be closed to press the document against the contact glass 301. When a start button, not shown, is pressed, the document set on the document stand 401 is conveyed onto the contact glass 301 of the scanner 300. Then, the scanner 300 is driven to drive first and second carriers 302 and 303. Light emitted from the first carrier 302 onto the document placed on the contact glass 301 is reflected from the document, and the light thus reflected is directed onto the second carrier 303 that further reflects the light using a mirror provided thereto so that the light enters a reading sensor 305 through an imaging lens 304. As a result, image data of the document is read.

Figure 3:
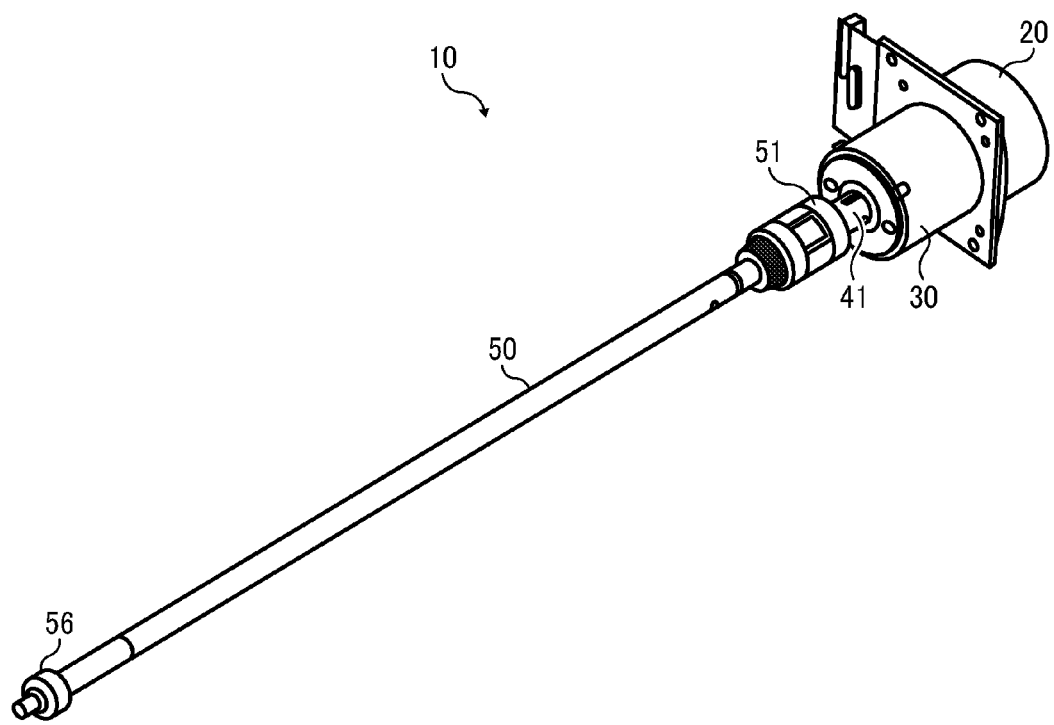
FIG. 3 is a perspective view illustrating an example of a configuration of a drive device according to a first illustrative embodiment.

At the same time when the start button is pressed, a drive motor, not shown, is driven, so that the drive roller 12 is rotatively driven to rotate the intermediate transfer belt 5. Simultaneously, the photoconductors 1 are evenly charged by the chargers 2, respectively, while being rotated in a counter-clockwise direction in FIG. 2 by a drive device 10 provided for each of the photoconductors 1. The drive device 10, which is illustrated in FIG. 3 and subsequent drawings, is described in detail later. Next, light beams Ly, Lm, Lc, and Lk (hereinafter collectively referred to as light beams L) are directed from the optical writing device 17 onto the photoconductors 1, respectively. Accordingly, electrostatic latent images of the specified colors are formed on the photoconductors 1, respectively. The electrostatic latent images are developed with toner by the developing devices 9, so that toner images of the specified colors are formed on the photoconductors 1, respectively. Specifically, a predetermined developing bias is supplied between the photoconductors 1 and developing rollers respectively included in the developing devices 9, so that toner of developer of the respective colors borne on the developing rollers is electrostatically attracted to the electrostatic latent images formed on the photoconductors 1, respectively. Accordingly, toner images of the respective colors are formed on the photoconductors 1.

The toner images thus formed on the photoconductors 1 are conveyed as the photoconductors 1 rotate to reach primary transfer positions where the photoconductors 1 contact the intermediate transfer belt 5, respectively. A predetermined bias voltage is supplied from the primary transfer rollers 6 to a back surface of the intermediate transfer belt 5 at the primary transfer positions. Accordingly, supply of the predetermined bias voltage generates primary transfer magnetic fields at the primary transfer positions to attract the toner images formed on the photoconductors 1 to the intermediate transfer belt 5, thereby primarily transferring the toner images onto the intermediate transfer belt 5 from the photoconductors 1. Thus, the toner images of the respective colors are sequentially transferred onto the intermediate transfer belt 5 and superimposed one atop the other to form a single full-color toner image on the intermediate transfer belt 5. It is to be noted that the belt cleaning device 19 removes residual toner from the intermediate transfer belt 5 after secondary transfer of the full-color toner image from the intermediate transfer belt 5 onto the sheet to be ready for the next sequence of image formation.

In addition, when the start button is pressed, one of sheet feed rollers 202 provided to the sheet feeder 200 is rotated based on a type of sheets selected by a user so that a sheet is fed from one of sheet feed cassettes 201 that holds a stack of sheets selected by the user. The sheet thus fed is separated from the rest of the stack of sheets by a separation roller 203 and enters a sheet feed path 204 to be conveyed to a sheet feed path 101 formed in the body 100 of the image forming apparatus 500 by a conveyance roller(s) 205. Then, conveyance of the sheet is temporarily stopped by a pair of registration rollers 102. Alternatively, a sheet may be fed from a manual sheet feed tray 105 by a sheet feed roller 104 in a case in which the sheet selected by the user is not set in any of the sheet feed cassettes 201. The sheet thus fed is separated from the rest of sheets placed on the manual sheet feed tray 105 by a separation roller 108 and is conveyed through a manual sheet feed path 103. Then, conveyance of the sheet is temporarily stopped by the pair of registration rollers 102.

Meanwhile, the full-color toner image thus formed on the intermediate transfer belt 5 is conveyed to a secondary transfer position opposite the secondary transfer roller 7 as the intermediate transfer belt 5 rotates. Rotation of the pair of registration rollers 102 is started to convey the sheet to the secondary transfer position at a predetermined timing in synchronization with the full-color toner image formed on the intermediate transfer belt 5. The secondary transfer roller 7 supplies a predetermined bias voltage to a back side of the sheet at the secondary transfer position so that a secondary transfer magnetic field is generated at the secondary transfer position. Accordingly, the full-color toner image is secondarily transferred onto the sheet from the intermediate transfer belt 5 by the secondary transfer magnetic field and a pressure supplied at the secondary transfer position. The sheet having the transferred full-color toner image thereon is then conveyed to the fixing device 18 by the conveyance belt 15 so that the full-color toner image is fixed to the sheet using the pair of fixing rollers 8. The sheet having the fixed full-color image is then discharged from the image forming apparatus 500 by a pair of discharge rollers 106 and is stacked on a discharge tray 107 provided outside the image forming apparatus 500.

A description is now given of a configuration that transmits torque from the drive source to a driven member such as the photoconductors 1 via a planetary gear reduction device 30. It is to be noted that the photoconductors 1 are driven by the drive devices 10 having the same configuration, respectively, and suffices Y, M, C, and K of reference numerals respectively denoting components provided to the drive devices 10 are hereinafter omitted. In addition, the drive device 10 is applicable not only to the photoconductors 1 but also to other driven members such as the drive roller 12 for the intermediate transfer belt 5.

Figure 4:
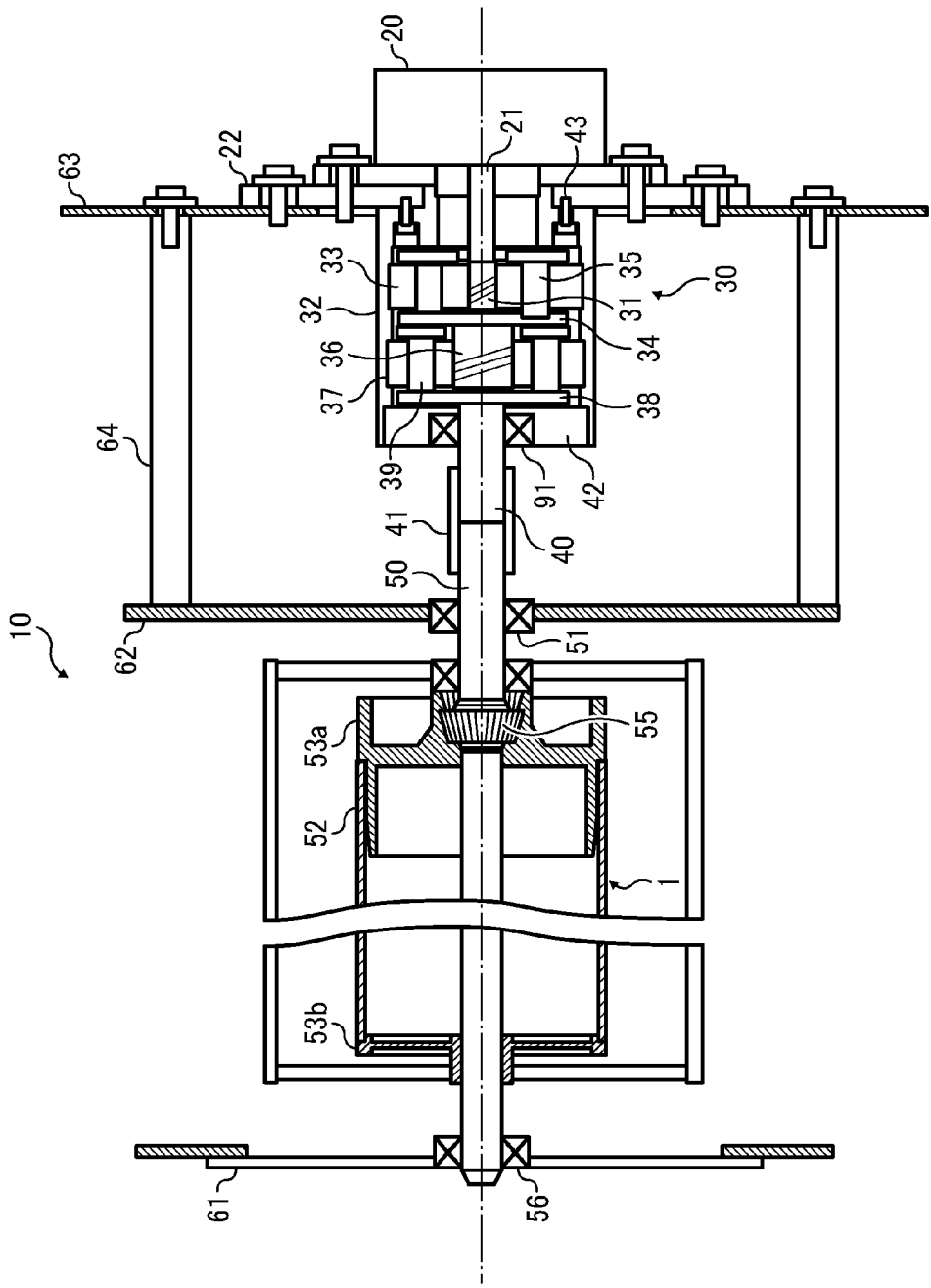
FIG. 4 is a vertical cross-sectional view illustrating the configuration of the drive device according to the first illustrative embodiment.
Figure 5:
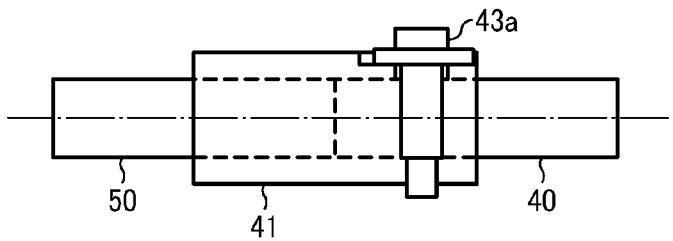
FIG. 5 is a schematic view illustrating an example of a configuration of a coupling member.
Figure 6:
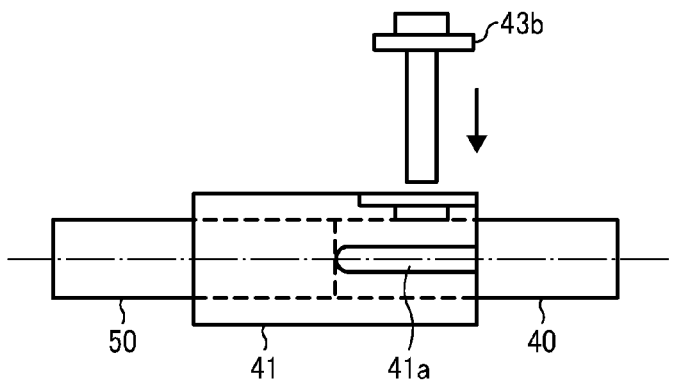
FIG. 6 is a schematic view illustrating another example of a configuration of a coupling member.
Figure 7:
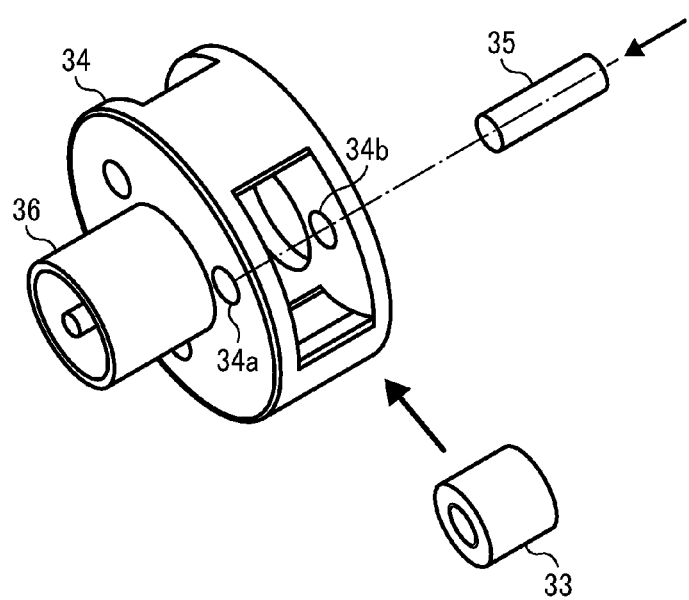
FIG. 7 is a perspective view illustrating assembly of a planetary gear into a carrier.

FIG. 3 is a perspective view illustrating the drive device 10 according to a first illustrative embodiment. FIG. 4 is a vertical cross-sectional view illustrating the configuration of the drive device 10 according to the first illustrative embodiment. FIG. 5 is a schematic view illustrating a first example of a configuration of a joint 41. FIG. 6 is a schematic view illustrating a second example of a configuration of the joint 41. FIG. 7 is a perspective view illustrating assembly of a first planetary gear 33 into a first carrier 34. FIG. 8A is a schematic view illustrating insertion of a first carrier pin 35 into the first planetary gear 33 according to a comparative example. FIG. 8B is a schematic view illustrating insertion of the first carrier pin 35 into the first planetary gear 33 according to the first illustrative embodiment.

The drive device 10 includes, as main components, the drive source (a motor 20), the planetary gear reduction device 30, a coupling member (the joint 41), and a driven shaft (a drum shaft 50). As illustrated in FIG. 4, an output shaft 40 of the planetary gear reduction device 30 is fixedly coupled to the drum shaft 50 by the hollow cylindrical joint 41. A bearing 51 is fitted onto the drum shaft 50, and the drum shaft 50 is supported and positioned via the bearing 51 by a rear lateral plate 62 fixed to a housing of the image forming apparatus 500. A proximal end of the drum shaft 50 is supported and positioned by a bearing 56 provided to a front lateral plate 61 fixed to the housing of the image forming apparatus 500. In other words, both ends of the drum shaft 50 are respectively supported and positioned via the bearings 56 and 51 by the front and rear lateral plates 61 and 62, each of which forms a part of the housing of the image forming apparatus 500, and the photoconductor 1 is positioned relative to the image forming apparatus 500 via the drum shaft 50. Accordingly, relative positions of the photoconductor 1 and members including the intermediate transfer belt 5 that need to be accurately positioned relative to the photoconductor 1 are accurately determined by the front and rear lateral plates 61 and 62. Thus, the photoconductor 1 can be accurately positioned relative to the multiple members that are associated with the photoconductor 1.

A description is now given of a detailed internal configuration of the planetary gear reduction device 30 with reference to FIG. 4. The planetary gear reduction device 30 used for the drive device 10 in the present embodiment has a 2KH-type two-stage structure. However, the number of stages may be increased depending on a reduction ratio. In the planetary gear reduction device 30, central axes of each of sun gears and carriers for each stage, an outer gear, and an output shaft provided to the carrier of the last stage are all aligned coaxially.

A first sun gear 31 of the first stage is directly cut into a motor output shaft 21 of the motor 20. The first planetary gears 33 of the first stage, each engaging both the first sun gear 31 and an outer gear 32 fixed to an outer gear flange 22, are supported by the first carrier 34 of the first stage to revolve around the first sun gear 31, respectively. The first planetary gears 33 are arranged at three positions in the first carrier 34 for the purpose of equalizing rotary balance and torque distribution. Thus, in the first illustrative embodiment, the three first planetary gears 33 are provided at equal intervals in a direction of rotation of the first carrier 34. Support pins, which, in the present illustrative embodiment, are the first carrier pins 35, each of which is fixedly supported by the first carrier 34 at both ends thereof, support the first planetary gears 33, respectively, so that the first planetary gears 33 are rotated around their own axes. While engaging the first sun gear 31 to rotate around their own axes, the first planetary gears 33 also engage the outer gear 32 to revolve around the first sun gear 31 within the outer gear 32. In other words, each of the first planetary gears 33 engages the first sun gear 31 in an inner orbit as well as the outer gear 32 in an outer orbit while revolving around the first sun gear 31. The first carrier 34 that rotatably supports the first planetary gears 33 is rotated by revolution of the first planetary gears 33 around the first sun gear 31 at reduced speed relative to rotation of the first sun gear 31, so that a reduction ratio for the first stage is obtained.

In the first illustrative embodiment, no rotation support member is provided to the first carrier 34. Therefore, the first carrier 34 is rotated floatingly. A detailed configuration of each of the first carrier 34, the first carrier pins 35, and the first planetary gears 33 is described later. A second stage in the planetary gear reduction device 30 includes a second sun gear 36 provided at the center of rotation of the first carrier 34 of the first stage. Thus, the second sun gear 36 is an input shaft for the second stage in the planetary gear reduction device 30 and is rotated by rotation of the first carrier 34.

While engaging the second sun gear 36 to rotate around their own axes, second planetary gears 37 of the second stage also engage the outer gear 32, which is used for both the first and second stages in the planetary gear reduction device 30, to revolve around the second sun gear 36 within the outer gear 32. In other words, each of the second planetary gears 37 engages the second sun gear 36 in an inner orbit as well as the outer gear 32 in an outer orbit while revolving around the second sun gear 36. A second carrier 38 that rotatably supports the second planetary gears 37 is rotated by revolution of the second planetary gears 37 around the second sun gear 36 at reduced speed relative to rotation of the second sun gear 36, so that a reduction ratio for the second stage is obtained. In the first illustrative embodiment, the four second planetary gears 37 are provided at equal intervals in a direction of rotation of the second carrier 38. Second carrier pins 39, each of which is fixedly supported by the second carrier 38 at both ends thereof, support the second planetary gears 37, respectively, so that the second planetary gears 37 are rotated around their own axes. The output shaft 40 is provided to the center of rotation of the second carrier 38 of the second stage, that is, the last stage in the planetary gear reduction device 30, and is coupled to the drum shaft 50 via the hollow cylindrical joint 41. The output shaft 40 is supported by a bearing 91 fitted onto an outer gear cap 42 positioned by the outer gear 32. Specifically, the outer gear cap 42 is positioned by fitting with the inner circumference of the outer gear 32. Accordingly, any misalignment between the output shaft 40 and the central axis of the outer gear 32 can be minimized during driving of the drive device 10. In addition, the central axis of the second carrier 38 of the last stage with which the output shaft 40 is provided is stationary relative to the outer gear 32. Therefore, rotational fluctuation of the output shaft 40 caused by self-alignment during rotation does not occur and any misalignment between the drum shaft 50 and the output shaft 40 can be minimized. As a result, the driven member, which, in the present illustrative embodiment, is the photoconductor 1, can be accurately driven.

The drum shaft 50 is provided between the photoconductor 1 and the output shaft 40 and is coaxially coupled to the output shaft 40 by the joint 41. Examples of configurations of the joint 41 are respectively illustrated in FIGS. 5 and 6. In a first example illustrated in FIG. 5, the joint 41 has a hollow cylindrical shape. The drum shaft 50 and the output shaft 40 of the planetary gear reduction device 30 have the same diameter, and a portion of the joint 41 adjacent to the drum shaft 50 is fitted onto the drum shaft 50. Meanwhile, at a portion of the joint 41 adjacent to the output shaft 40, the output shaft 40 is inserted into the joint 41 with play therebetween and is fixedly coupled to the joint 41 with a shoulder screw 43a. By contrast, in a second example illustrated in FIG. 6, the joint 41 has a slit 41a at the center of its hollow cylindrical shape. The output shaft 40 is fixedly coupled to the joint 41 by a frictional force with the joint 41 pressed by a screw 43b. Both configurations respectively illustrated in FIGS. 5 and 6 minimize displacement between the central axes of each of the drum shaft 50 and the output shaft 40 at the joint 41, thereby accurately transmitting the torque from the output shaft 40 to the drum shaft 50.

Provision of the joint 41 can achieve attachment and detachment of the photoconductor 1 and the drum shaft 50 to and from the image forming apparatus 500 during maintenance and accurate positioning of the photoconductor 1 relative to the image forming apparatus 500 via the drum shaft 50 supported and positioned by the front and rear lateral plates 61 and 62, each of which forms a part of the housing of the image forming apparatus 500. In addition, the drum shaft 50 and the output shaft 40 are coupled to each other by being fitted with each other within the hollow cylindrical-shaped joint 41 as described above. Accordingly, only the straightness inside the hollow cylindrical shape of the joint 41 affects the coaxiality between the drum shaft 50 and the output shaft 40 of the planetary gear reduction device 30, thereby minimizing misalignment.

Returning to FIG. 4, the motor output shaft 21 of the motor 20 is supported by the outer gear flange 22. The outer gear 32 is fixed to the outer gear flange 22 with screws 43. Thus, the outer gear flange 22 fixes and holds both the outer gear 32 and the motor 20. The outer gear flange 22 is fixed to a drive lateral plate 63 with screws. The drive lateral plate 63 is supported and positioned by a stud 64 swaged in the rear lateral plate 62. A hollow cylindrical-shaped boss is provided to the central axis of the outer gear 32 closer to the motor 20, and the motor 20 is positioned by engagement of an inner circumference of the cylindrical shape of the boss and a bearing provided to the motor 20. An outer circumference of the hollow cylindrical shape of the boss is positioned by engaging a hole formed in the outer gear flange 22.

With such a configuration, all the central axes of the motor output shaft 21, the outer gear flange 22, the output shaft 40 of the planetary gear reduction device 30, and the drum shaft 50 are coaxially aligned with the central axis of the outer gear 32 as a reference, and any misalignment caused by a variation in the size of each component can be minimized. The planetary gear reduction device 30 is supported by the rear lateral plate 62 and the drive lateral plate 63 supported by the rear lateral plate 62, thereby preventing the planetary gear reduction device 30 from being bent by the weight of the planetary gear reduction device 30 itself and the motor 20. As a result, any misalignment between the motor 20 and the drum shaft 50 can be minimized, thereby accurately driving the photoconductor 1.

The photoconductor 1 is constructed of a cylindrical drum 52 and drum flanges 53a and 53b provided to both ends of the drum 52, respectively. The drum 52 is positioned by the drum shaft 50 via the drum flanges 53a and 53b. Each of the drum flanges 53a and 53b has a hole at a central axis of the drum 52, and the drum 52 is positioned by the drum shaft 50 by engagement of the holes and the drum shaft 50. A joint 55 that transmits the torque to the drum 52 is fitted onto the drum shaft 50 so that the drum 52 is driven via the drum flange 53a. Accordingly, the central axis of the drum 52 is also aligned coaxially with the central axes of each of the motor output shaft 21, the drum shaft 50, and so forth. In other words, all the central axes of the motor output shaft 21, the first sun gear 31, the outer gear 32, the first carrier 34, the second sun gear 36, the second carrier 38, the output shaft 40 of the planetary gear reduction device 30, the drum shaft 50, and the drum 52 are aligned coaxially with one another. As a result, any misalignment caused by a variation in the size of each component can be minimized.

A description is now given of material used for each of the components of the planetary gear reduction device 30. Each of the motor output shaft 21 of the motor 20, the first sun gear 31, which is an input shaft of the planetary gear reduction device 30 and is directly cut into the motor output shaft 21, the first carrier pins 35, and the second carrier pins 39 is formed of metal such as stainless steel and carbon steel. Each of the first planetary gears 33, the first carrier 34, the second sun gear 36 formed together with the first carrier 34, the second planetary gears 37, the second carrier 38, and the outer gear 32 that engage both the first and second planetary gears 33 and 37 and is formed together with the casing of the planetary gear reduction device 30 is formed of resin such as polyacetal.

Thus, at least the first planetary gears 33, the second planetary gears 37, and the outer gear 32 are formed of resin that has lower rigidity than metal, thereby reducing impact between the gears during engagement of the gears. As a result, rotational fluctuation caused by engagement of the gears can be reduced. In addition, low rigidity of the outer gear 32 causes the outer gear 32 itself to fluctuate so as to be aligned depending on the tolerances of each gear while engaging the first and second planetary gears 33 and 37, thereby minimizing rotational fluctuation caused by engagement of the gears.

Each stage in an ordinary 2KH-type planetary gear mechanism includes a sun gear, multiple planetary gears, a carrier that supports orbital motion or revolution of the multiple planetary gears around the sun gear, and an outer gear having inward-facing teeth. One of rotation of the sun gear, revolution of the planetary gears around the sun gear (or rotation of the carrier), and rotation of the outer gear is held stationary, and one of the two remaining components is an input that provides power to the planetary gear mechanism, while the last component is an output that receives power from the mechanism. Setting of multiple reduction ratios and switching of directions of rotation and revolution of the gears are achieved depending on how the above-described three components are assigned. The 2KH-type two-stage planetary gear mechanism is classified as a compound planetary gear mechanism having multiple 2KH-type planetary gear mechanisms, and each of the multiple 2KH-type planetary gear mechanisms includes three reference shafts. Two of the three reference shafts are coupled to each other while the remaining reference shaft is held stationary. One of the two reference shafts coupled to each other serves as a drive shaft or a driven shaft.

The reduction ratio obtained in the 2KH-type planetary gear reduction device is calculated by Formula 1 below, where the number of teeth of each of the sun gears is Za, the number of teeth of each of the planetary gears is Zb, and the number of teeth of the outer gear is Zc. It is to be noted that, suffixes "1" and "2" in the formula below indicate the first and second stages in the planetary gear mechanism, respectively.

$$\text{Reduction Ratio} = Za1/(Za1+Zc1) \times Za2/(Za2+Zc2)$$

A description is now given of a configuration of each of the first and second carriers 34 and 38. Each of the first and second carriers 34 and 38 according to the first illustrative embodiment is formed as a single integrated unit having holes, into which both ends of each of the carrier pins 35 or 39 are fitted, to support the carrier pins 35 or 39. In FIG. 7, a configuration of the first carrier 34 of the first stage in the planetary gear reduction device 30 is illustrated as a representative example. The first carrier 34 is constructed as a single integrated unit including a first lateral plate to which the second sun gear 36 is provided, a second lateral plate provided closer to the motor 20, and three coupling portions that couple the first and second lateral plates to each other. Holes 34a and 34b are formed in the first and second lateral plates, respectively, to support both ends of each of the first carrier pins 35. The first carrier 34 into which the first planetary gears 33 and the first carrier pins 35 are assembled in advance is mounted to the planetary gear reduction device 30. In order to assemble the first planetary gears 33 into the first carrier 34, first, the first planetary gears 33 are inserted into the first carrier 34 from openings formed in the lateral circumference of the first carrier 34, respectively, in which no coupling portion is provided. Then, both ends of each of the first carrier pins 35 are inserted into the holes 34a and 34b formed in the first and second lateral plates of the first carrier 34, respectively, so that the first planetary gears 33 are assembled into the first carrier 34. A diameter of each of the first carrier pins 35 is slightly larger than a diameter of each of the holes 34a and 34b, and both ends of each of the first carrier pins 35 are fitted onto the holes 34a and 34b, respectively.

Thus, both ends of each of the first carrier pins 35 are respectively supported by the first and second lateral plates, both of which are formed together as a single integrated unit, that is, the first carrier 34, thereby reducing tilt of each of the first planetary gears 33.

The following problems may occur in a carrier according to a comparative example illustrated in FIG. 8A in which first and second lateral plates individually provided to the carrier to sandwich and hold, via needle bearings, both ends of a carrier pin that supports the planetary gear are simply united in a single unit. In the comparative example illustrated in FIG. 8A, two needle bearings 333a are provided to both ends of a planetary gear 333, respectively, and a carrier pin 335 supports the planetary gear 333 via the needle bearings 333a. In order to assemble the planetary gear 333 into a carrier 334 according to the comparative example, first, the planetary gear 333 is inserted into the carrier 334 from an opening formed in the lateral circumference of the carrier 334, in which no coupling portion is provided. Then, the carrier pin 335 is inserted all the way through a hole 334b formed in the second lateral plate of the carrier 334, the two needle bearings 333a provided to both ends of the planetary gear 333, and a hole 334a formed in the first lateral plate of the carrier 334, in that order, from right to left in FIG. 8A, thereby complicating assembly of the planetary gear 333 into the carrier 334. In particular, the configuration in which the needle bearings 333a are provided to both ends of the planetary gear 333 as illustrated in FIG. 8A reduces a width of engagement of the carrier pin 335 and the planetary gear 333. Consequently, the carrier pin 335 tends to tilt when being inserted into the planetary gear 333 and therefore is not easily inserted into the hole 334a provided to the downstream side of the carrier 334 in a direction of insertion of the carrier pin 335, thereby considerably preventing easy assembly of the planetary gear 333 into the carrier 334. To solve the above problems, conventionally, the first and second lateral plates of the carrier 334 are often provided separately from each other, and both ends of the carrier pin 335 that supports the planetary gear 333 are sandwiched between the first and second lateral plates via the needle bearings 333a to assemble the planetary gear 333 into the carrier 334.

By contrast, in the first illustrative embodiment, as illustrated in FIG. 8B, bearings such as the needle bearings 33a are not provided at contact portions in which the first planetary gear 33 and the first carrier pin 35 that rotatably supports the first planetary gear 33 contact each other. Accordingly, a width of engagement of the first carrier pin 35 and the first planetary gear 33 is extended, thereby preventing the axis of the first planetary gear 33 from being tilted when the first carrier pin 35 is inserted into the first planetary gear 33. As a result, the first planetary gear 33 and the first carrier pin 35 can be easily assembled into the first carrier 34.

The following effects can be achieved by the first illustrative embodiment. The photoconductors 1 can be accurately driven with a space-saving configuration at reduced costs, thereby preventing production of irregular images including jitter caused by rotational fluctuation of the photoconductor 1. In addition, as described previously, the present illustrative embodiment is also applicable to a drive device for the drive roller 12 that rotatively drives the intermediate transfer belt 5. As a result, the intermediate transfer belt 5 can be accurately driven with a space-saving configuration at reduced costs, thereby preventing irregular images including color shift caused by rotational fluctuation of the intermediate transfer belt 5. Employment of the present illustrative embodiment to both the drive devices for the photoconductors 1 and for the drive roller 12 that rotatively drives the intermediate transfer belt 5 can achieve accurate driving of both the photoconductors 1 and the intermediate transfer belt 5. Thus, rotational fluctuation of both the photoconductors 1 and the intermediate transfer belt 5 can be reliably prevented, thereby providing high-quality images.

Figure 9:
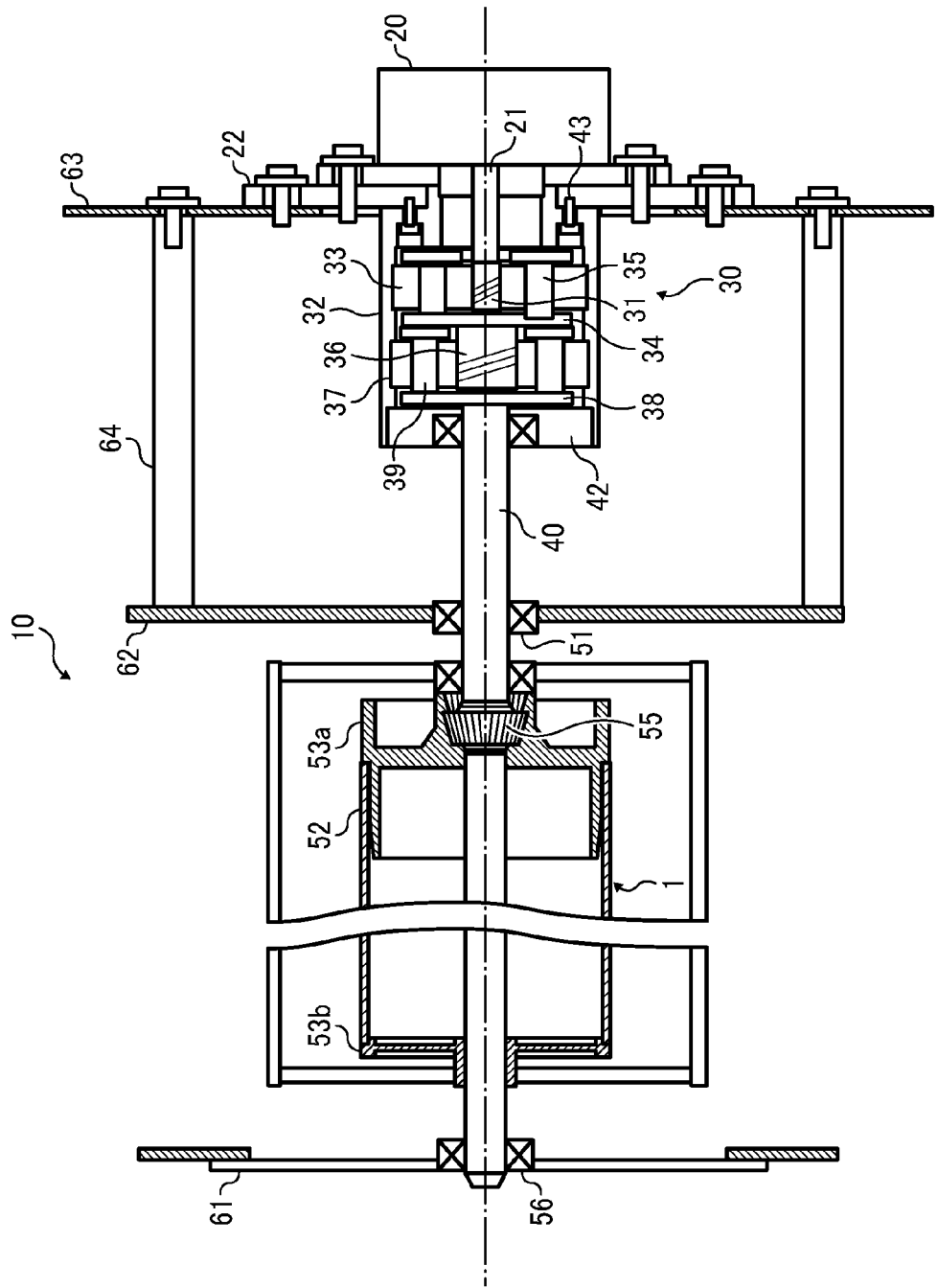
FIG. 9 is a vertical cross-sectional view illustrating an example of a configuration of a drive device according to a second illustrative embodiment.

A description is now given of a configuration of the drive device 10 according to a second illustrative embodiment. FIG. 9 is a vertical cross-sectional view illustrating an example of a configuration of the drive device 10 according to the second illustrative embodiment. It is to be noted that, in the second illustrative embodiment, components already described in the first illustrative embodiment are denoted by the same reference numerals, and thus a detailed description thereof is omitted.

In the second illustrative embodiment, the output shaft 40 of the planetary gear reduction device 30 is extended to the front lateral plate 61 of the image forming apparatus 500, and the drum 52 of the photoconductor 1 is positioned by the output shaft 40 via the drum flanges 53a and 53b. In other words, in the second illustrative embodiment, the output shaft 40 also functions as the drum shaft 50 described in the first illustrative embodiment. Therefore, provision of the joint 41 that couples the output shaft 40 to the drum shaft 50 is not necessary, thereby eliminating accumulation of misalignment caused by the joint 41. Thus, any misalignment between the output shaft 40 and the drum shaft 50 can be eliminated.

Figure 10:
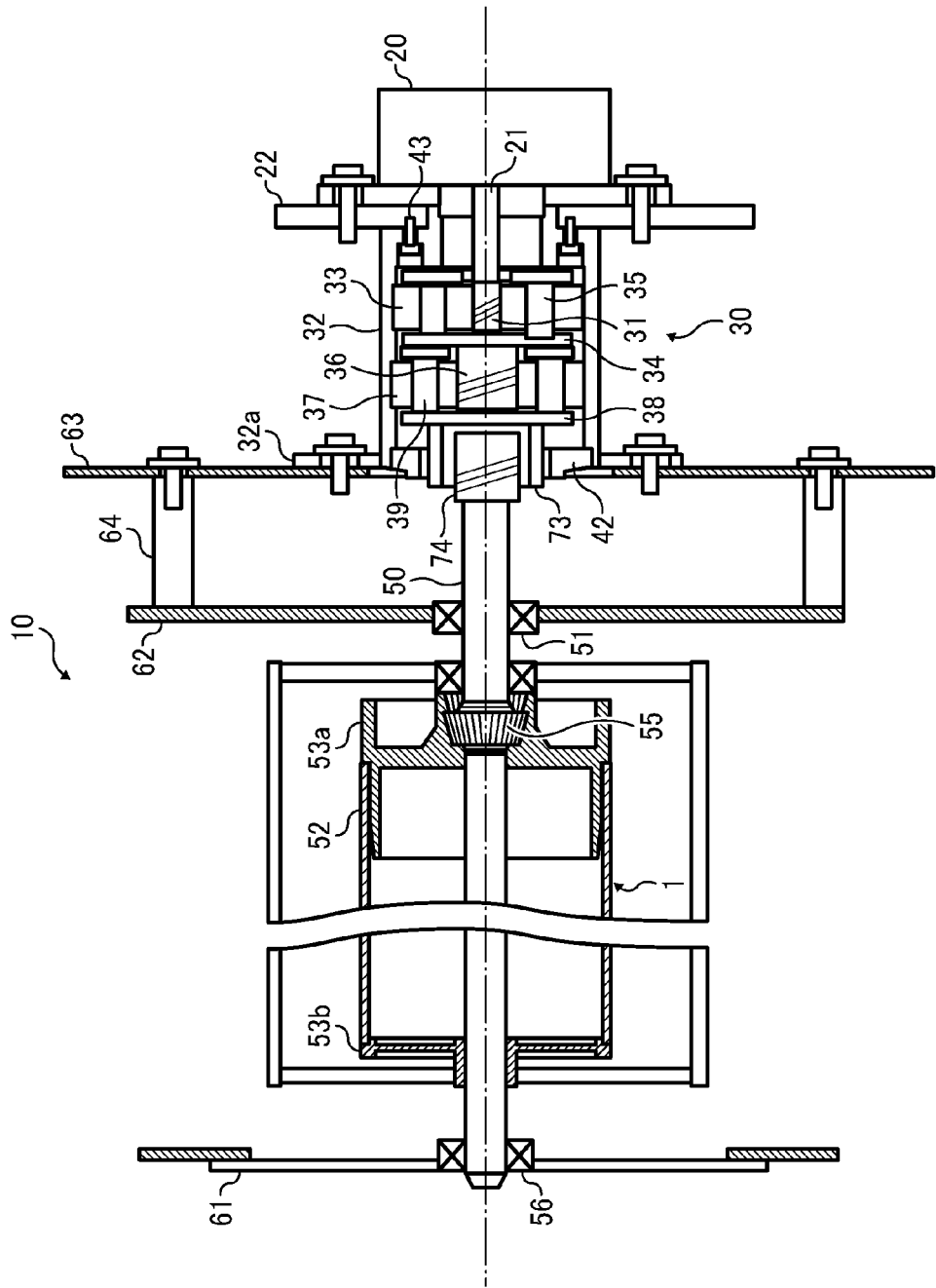
FIG. 10 is a vertical cross-sectional view illustrating an example of a configuration of a drive device according to a third illustrative embodiment.
Figure 11:
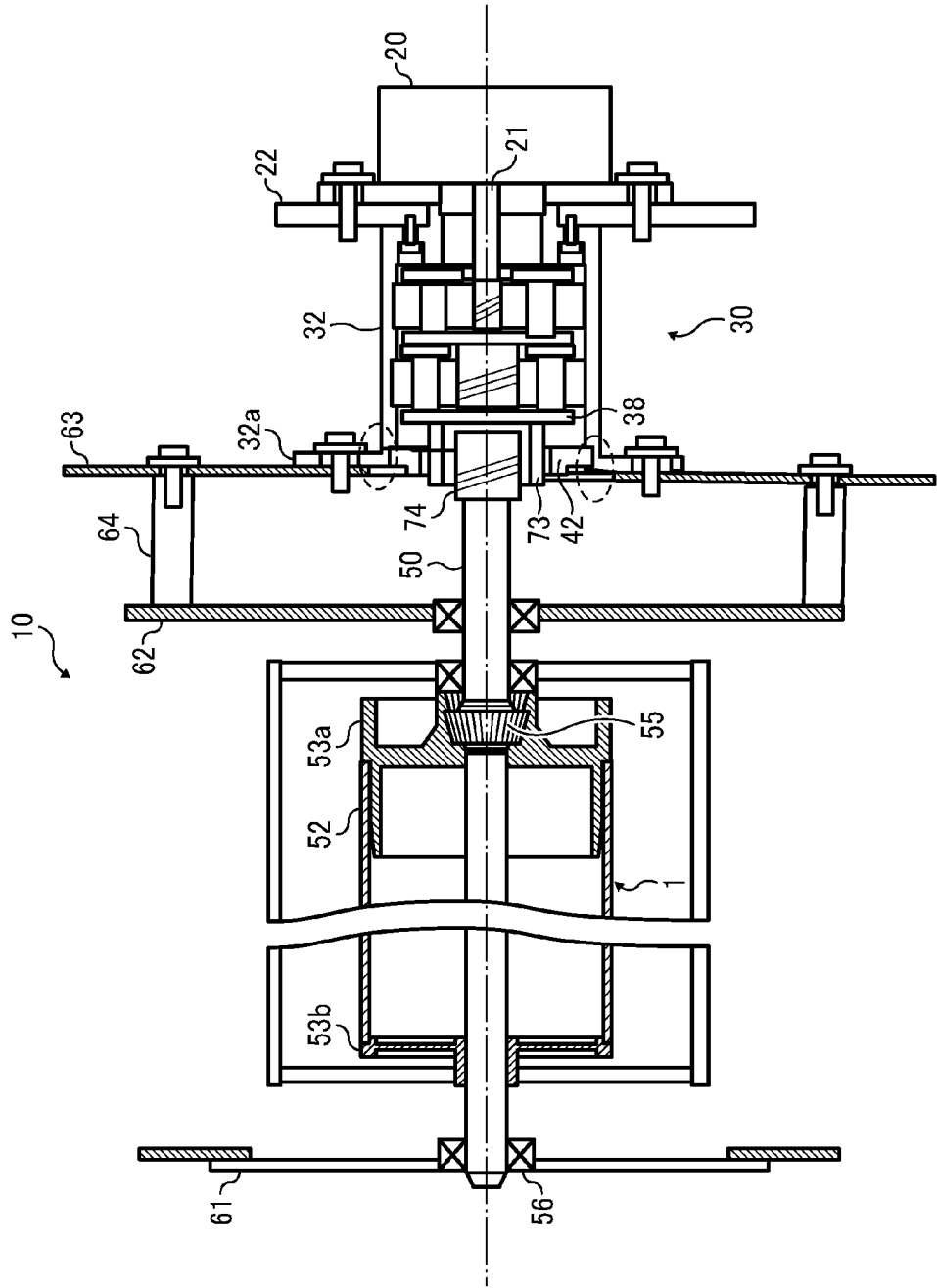
FIG. 11 is a vertical cross-sectional view illustrating a deformed portion in a seating face of an outer gear provided to the drive device according to the third illustrative embodiment.

A description is now given of a configuration of the drive device 10 according to a third illustrative embodiment. FIG. 10 is a vertical cross-sectional view illustrating an example of a configuration of the drive device 10 according to the third illustrative embodiment. FIG. 11 is a vertical cross-sectional view illustrating a deformed portion in a seating face 32a of the outer gear 32 provided to the drive device 10 according to the third illustrative embodiment. It is to be noted that, in the third illustrative embodiment, components already described in the first illustrative embodiment are denoted by the same reference numerals, and thus a detailed description thereof is omitted.

The planetary gear reduction device 30 used for the drive device 10 according to the third illustrative embodiment also has a 2KH-type two-stage structure. In a manner similar to the first illustrative embodiment, the drive device 10 according to the third illustrative embodiment includes the motor 20, the first sun gear 31, the first planetary gears 33, the first carrier 34, the second sun gear 36, the second planetary gears 37, the first carrier pins 35, and the second carrier pins 39.

As illustrated in FIG. 10, a female spline joint 73 formed together with the second carrier 38 as a single integrated unit is provided to the center of rotation of the second carrier 38. Meanwhile, a male spline joint 74 is fitted onto the proximal end of the drum shaft 50 so that the drum shaft 50 is coupled to the planetary gear reduction device 30 via the joints 73 and 74. Although the male spline joint 74 is provided to the drum shaft 50 and the female spline joint 73 is provided to the second carrier 38 in the above-described example, alternatively, provision of the male and female spline joints 74 and 73 may be reversed. Because the spline joint exerts a concentric force while in operation, any misalignment between the spline joint 73 that functions as the output shaft of the planetary gear reduction device 30 and the drum shaft 50 can be minimized. No rotation support member is provided to the second carrier 38 relative to the outward gear 32. Therefore, the second carrier 38 is rotated floatingly. As a result, the second carrier 38 is aligned based on the accuracy of engagement of the outward gear 32 and the second planetary gears 37 during driving of the planetary gear reduction device 30, thereby reducing rotational fluctuation.

In addition, because the drum shaft 50 is coupled to the planetary gear reduction device 30 by the spline joints 73 and 74, the spline joint 74 is concentric with the spline joint 73 depending on alignment of the spline joint 73 provided to the second carrier 38. As a result, rotational fluctuation caused by eccentricity generated by self-alignment of the second carrier 38 is not transmitted to the drum shaft 50. Further, it has been confirmed that the outward gear 32 is also aligned because it is formed of resin.

The seating face 32a formed in an output side of the outward gear 32 is fastened to the drive lateral plate 63 with screws so that the planetary gear reduction device 30 is fixedly held by the drive lateral plate 63. The drive lateral plate 63 is supported and positioned by the stud 64 swaged in the rear lateral plate 62. If the stud 64 is not swaged in the rear lateral plate 62 at a right angle, the drive lateral plate 63, which is fixed to the rear lateral plate 62 via the stud 64, is fixed to the rear lateral plate 62 at a slant. At this time, if the planetary gear reduction device 30 is fixed to the rear lateral plate 62 via the drive lateral plate 63 at the same slant as the drive lateral plate 63, the following problems may occur because the drum shaft 50 is positioned by the front and rear lateral plates 61 and 62: The spline joint 73 is slanted relative to the spline joint 74, and therefore does not properly engage the spline joint 74. Even if the spline joint 73 engage the spline joint 74 somehow, a displacement between the spline joints 73 and 74 may cause rotational fluctuation.

However, in the third illustrative embodiment, the seating face 32a of the outward gear 32 is fixed to the drive lateral plate 63 and the outward gear 32 is formed of resin which has lower rigidity than metal. Accordingly, only the base portions of the seating face 32a that are indicated and encompassed by broken-line circles in FIG. 11 are deformed when the seating face 32a is fastened to the drive lateral plate 63 with the screws. Although the seating face 32a follows the drive lateral plate 63 as illustrated in FIG. 11, the outer gear 32 is not slanted entirely so that the spline joint 73 can coaxially engage the spline joint 74.

In other words, because the planetary gear reduction device 30 is supported by the drive lateral plate 63 via the outer gear 32, in a case in which the drive lateral plate 63 is slanted relative to the rear lateral plate 62, the outer gear 32 is fixed to the drive lateral plate 63 with the seating face 32a, which is fastened to the drive lateral plate 63, deformed. However, because the second carrier 38 is supported floatingly relative to the outer gear 32 as described previously, deformation of the outer gear 32 is compensated by alignment of the second carrier 38. In addition, because the outer gear 32 is formed of resin, deformation of the outer gear 32 aligns the outer gear 32 itself. Accordingly, deformation of the outer gear 32 caused by fastening of the outer gear 32 to the drive lateral plate 63 does not cause rotational fluctuation of the planetary gear reduction device 30.

Figure 12:
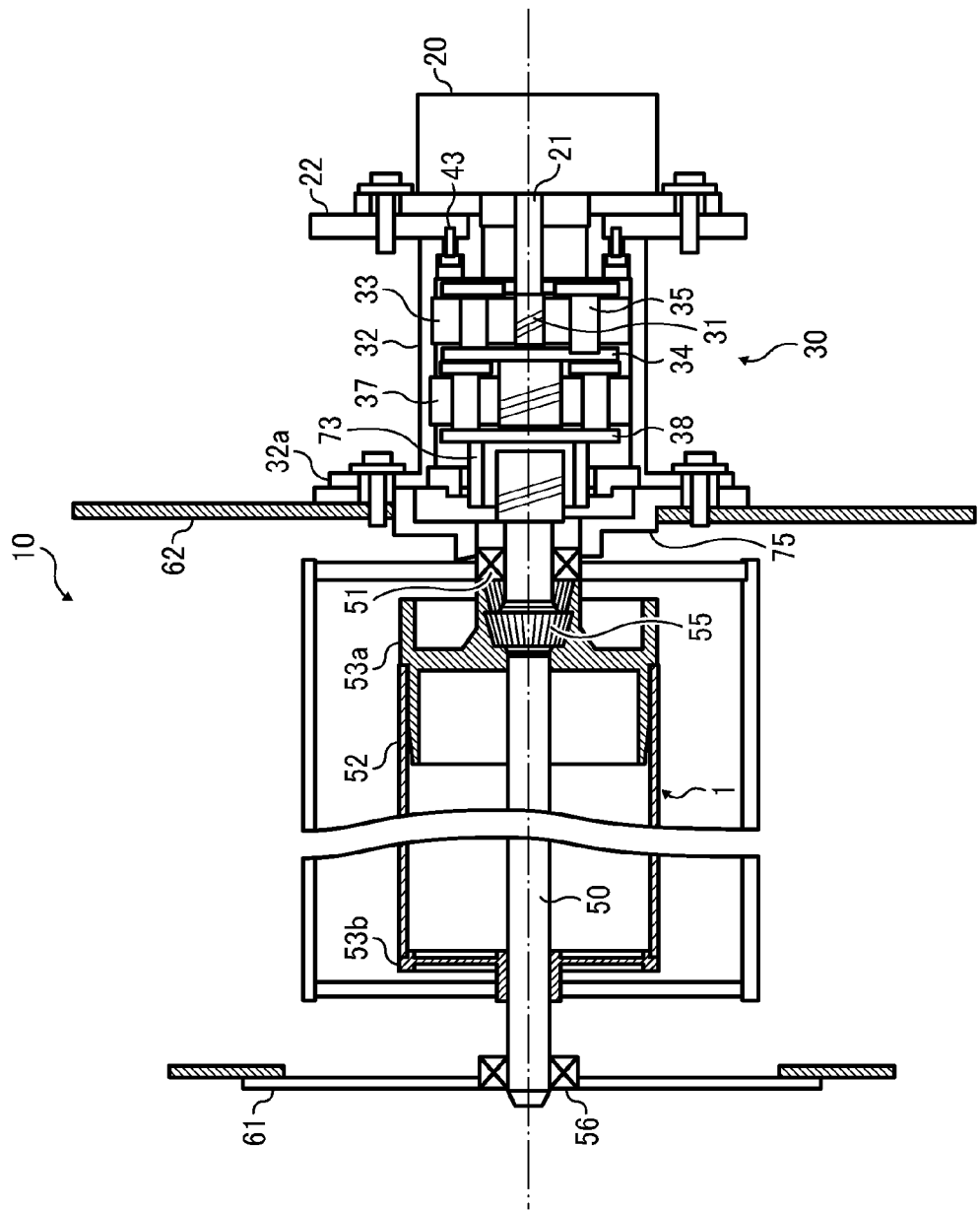
FIG. 12 is a vertical cross-sectional view illustrating an example of a configuration of a drive device according to a fourth illustrative embodiment.

A description is now given of a configuration of the drive device 10 according to a fourth illustrative embodiment. FIG. 12 is a vertical cross-sectional view illustrating an example of a configuration of the drive device 10 according to the fourth illustrative embodiment. It is to be noted that in the fourth illustrative embodiment, components already described in the first to third illustrative embodiments are denoted by the same reference numerals, and thus a detailed description thereof is omitted.

In the planetary gear reduction device 30 according to the fourth illustrative embodiment, a housing 75 is provided to the rear lateral plate 62 coaxially with the drum shaft 50. The housing 75 supports the bearing 51 of the photoconductor 1. The seating face 32a of the outer gear 32 contacts the housing 75 and is supported by the rear lateral plate 62 with screws. Thus, differing from the first to third illustrative embodiments, the planetary gear reduction device 30 according to the fourth illustrative embodiment is directly supported by the rear lateral plate 62.

Figure 13:
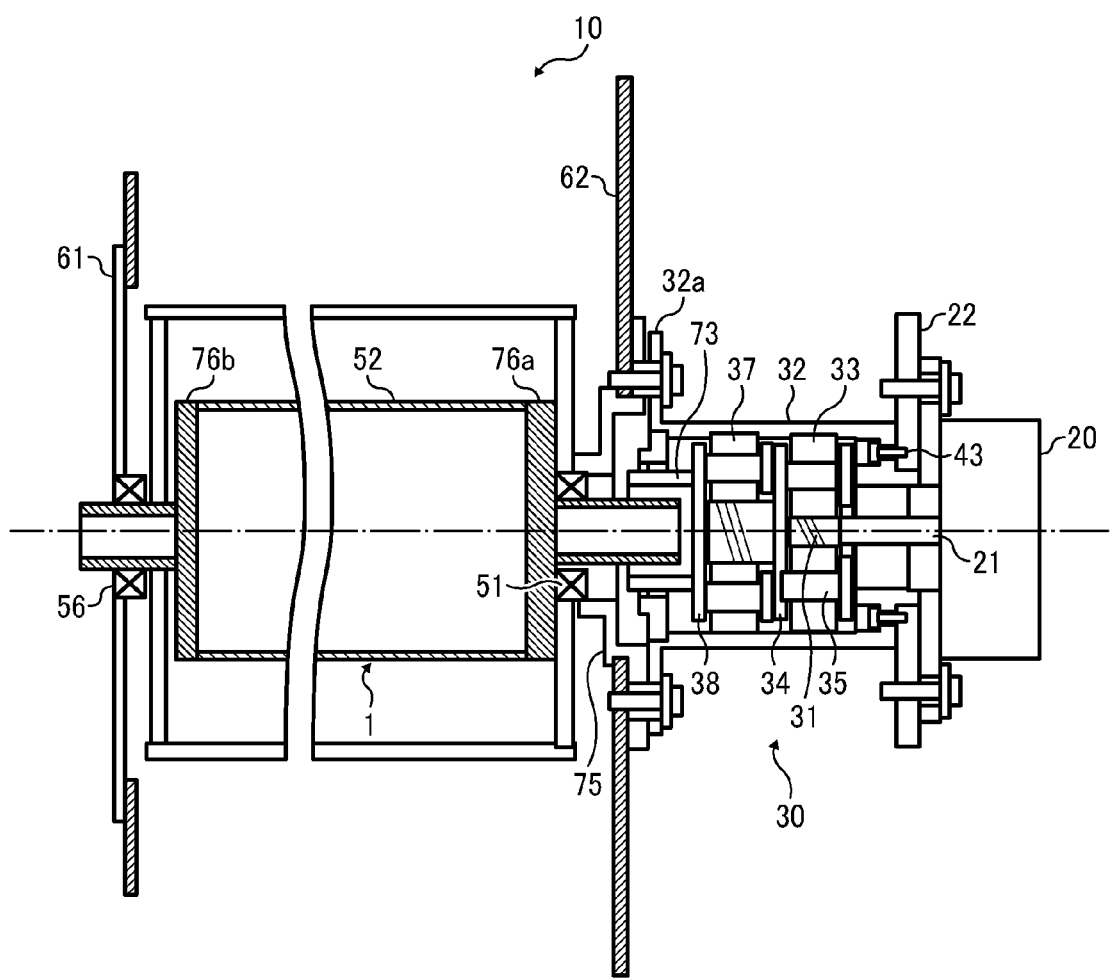
FIG. 13 is a vertical cross-sectional view illustrating an example of a configuration of a drive device according to a fifth illustrative embodiment.

A description is now given of a configuration of the drive device 10 according to a fifth illustrative embodiment. FIG. 13 is a vertical cross-sectional view illustrating an example of a configuration of the drive device 10 according to the fifth illustrative embodiment. It is to be noted that in the fifth illustrative embodiment, components already described in the first to fourth illustrative embodiments are denoted by the same reference numerals, and thus a detailed description thereof is omitted.

In the planetary gear reduction device 30 according to the fifth illustrative embodiment, the drum shaft is not provided. Instead, drum flanges 76a and 76b are fitted onto both ends of the drum 52 of the photoconductor 1, respectively. A cylindrical boss is provided to the center of rotation of each of the drum flanges 76a and 76b. The drum flange 76b is supported by the bearing 56 provided to the front lateral plate 61 via the boss. A gear is formed in the outer circumference of the cylindrical boss provided to the drum flange 76a and engages the spline joint 73 that functions as the output shaft of the planetary gear reduction device 30. Although a male spline joint is provided to the drum flange 76a and the female spline joint 73 is provided to the second carrier 38 in the above-described example, alternatively, provision of the male and female spline joints may be reversed.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary variations are not to be regarded as a departure from the scope of the present invention, and all such modifications as would be obvious to one skilled in the art are intended to be included within the scope of the following claims.

The number of constituent elements and their locations, shapes, and so forth are not limited to any of the structure for performing the methodology illustrated in the drawings.

What is claimed is:
1. A drive device, comprising:
a planetary gear reduction device including at least two stages and an output shaft, each stage including:
a sun gear rotatable by torque from a drive source;
an outer gear disposed coaxially with the sun gear;
multiple planetary gears disposed within the outer gear at equal intervals along an inner circumference of the outer gear to engage both the sun gear and the outer gear, respectively;
a carrier rotatable coaxially with both the sun gear and the outer gear to rotatably support the multiple planetary gears; and
a support shaft held by the carrier to rotatably support each of the multiple planetary gears,
wherein the output shaft is provided to the carrier of the last stage; and a driven shaft to support a driven member rotatively driven by torque by the planetary gear reduction device and transmit the torque from the output shaft of the planetary gear reduction device to the driven member,
wherein central axes of the sun gear, the outer gear, the carrier, the output shaft, the driven shaft, and the driven member are all arranged coaxially with one another and at least one carrier is floatingly supported relative to the outer gear,
wherein the carrier includes:
a first lateral plate and a second lateral plate disposed to sandwich the multiple planetary gears therebetween in an axial direction, each of the first and second lateral plates includes a hole,
a plurality of holes formed in the first and second lateral plates to support a carrier pin forming a single integrated unit, and
an opening provided between the first and second plates, wherein the opening is formed such that the planetary gears are insertable into the carrier from outside through the opening, and
wherein a diameter of the carrier pin is larger than a diameter of the plurality of holes in the first and second lateral plates so that both ends of the carrier pin are fitted onto the respective holes of the first and second lateral plates.

2. The drive device according to claim 1, wherein the carrier of the last stage in the planetary gear reduction device is supported such that the center of rotation of the carrier is stationary relative to the outer gear.

3. The drive device according to claim 1, wherein:
both ends of the driven shaft are respectively positioned via bearings by front and rear lateral plates each forming a part of a housing of an apparatus using the drive device; and
the planetary gear reduction device is supported by the rear lateral plate and a drive lateral plate held by the rear lateral plate.

4. The drive device according to claim 3, wherein the planetary gear reduction device is supported by the drive lateral plate via the outer gear.

5. The drive device according to claim 1, wherein the multiple planetary gears and the outer gear are formed of resin.

6. The drive device according to claim 1, further comprising a hollow, cylindrical-shaped coupling member to couple the output shaft of the planetary gear reduction device to the driven shaft.

7. The drive device according to claim 1, further comprising a spline joint to couple the output shaft of the planetary gear reduction device to the driven shaft.

8. The drive device according to claim 1, wherein the output shaft of the planetary gear reduction device and the driven shaft are formed together as a single integrated shaft.

9. The drive device according to claim 1, wherein each of the multiple planetary gears and the support shaft that rotatably supports each of the planetary gears contact with each other without a bearing interposed therebetween.

10. The drive device according to claim 1, wherein the opening is formed in a lateral circumference surface of the carrier.

11. The drive device according to claim 1, wherein the carrier pin is formed of metal, and portions of the first and second lateral plates of the carrier where the plurality of holes is formed are formed of resin.

12. The drive device according to claim 11, wherein the sun gear on a stage later than the carrier and the first lateral plate of the carrier are formed into a single integrated unit formed of resin.

13. An image forming apparatus, comprising:
a driven member; and
a drive device to rotatively drive the driven member, the drive device including:

a planetary gear reduction device including at least two stages and an output shaft, each stage comprising:
a sun gear rotatable by torque from a drive source;
an outer gear disposed coaxially with the sun gear;
multiple planetary gears disposed within the outer gear at equal intervals along an inner circumference of the outer gear to engage both the sun gear and the outer gear, respectively;
a carrier rotatable coaxially with both the sun gear and the outer gear to rotatably support the multiple planetary gears; and
a support shaft held by the carrier to rotatably support each of the multiple planetary gears, wherein the output shaft is provided to the carrier of the last stage; and
a driven shaft to support the driven member and transmit torque from the output shaft of the planetary gear reduction device to the driven member,
wherein central axes of the sun gear, the outer gear, the carrier, the output shaft, the driven shaft, and the driven member are all arranged coaxially with one another and at least one carrier is floatingly supported relative to the outer gear,
wherein the carrier includes:
a first lateral plate and a second lateral plate disposed to sandwich the multiple planetary gears therebetween in an axial direction, each of the first and second lateral plates includes a hole,
a plurality of holes formed in the first and second lateral plates to support a carrier pin forming a single integrated unit, and
an opening provided between the first and second plates,
wherein the opening is formed such that the planetary gears are insertable into the carrier from outside through the opening, and
wherein a diameter of the carrier pin is larger than a diameter of the plurality of holes in the first and second lateral plates so that both ends of the carrier pin are fitted onto the respective holes of the first and second lateral plates.

14. The image forming apparatus according to claim 13, wherein the opening is formed in a lateral circumference surface of the carrier.

15. The image forming apparatus according to claim 13, wherein the carrier pin is formed of metal, and portions of the first and second lateral plates of the carrier where the plurality of holes is formed are formed of resin.

16. The image forming apparatus according to claim 15, wherein the sun gear on a stage later than the carrier and the first lateral plate of the carrier are formed into a single integrated unit formed of resin.

* * * * *